J. J. FARRELL.
LOCK NUT.
APPLICATION FILED JUNE 13, 1910.

1,039,916.

Patented Oct. 1, 1912.

WITNESSES

INVENTOR
John James Farrell
BY
Attorney

UNITED STATES PATENT OFFICE.

JOHN J. FARRELL, OF ARDMORE, PENNSYLVANIA.

LOCK-NUT.

1,039,916. Specification of Letters Patent. Patented Oct. 1, 1912.

Application filed June 13, 1910. Serial No. 566,593.

*To all whom it may concern:*

Be it known that I, JOHN JAMES FARRELL, a citizen of the United States, residing at Ardmore, in the county of Montgomery, State of Pennsylvania, have invented certain new and useful Improvements in Lock-Nuts, of which the following is a description, reference being had to the accompanying drawings, forming a part hereof.

My invention relates to lock nuts of the type wherein the locking action is accomplished by the distortion of a portion of the body of the nut, and the object thereof is to provide an improved lock nut formed in a single piece so that the entire securing and locking function is accomplished by means of a single integral nut structure, and, furthermore, to provide an improved lock nut in which the act of tightening the nut upon the bolt and against its seat results in the distortion of the nut and accomplishes the locking action.

The accompanying drawing illustrates the preferred embodiment of my invention in a concrete lock nut, and the same is described in the following specification and particularly claimed in the concluding claims.

Figure 1:
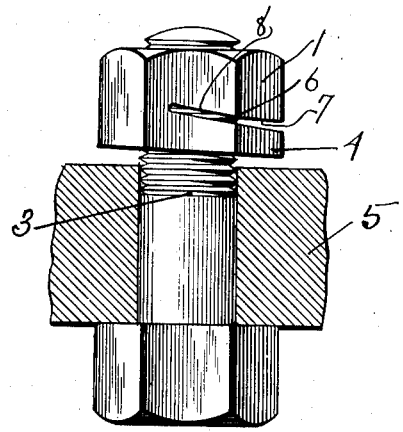
Figure 2:
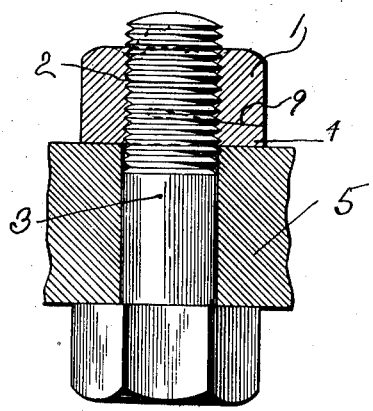

In the drawing: Figure 1 is a view showing my improved lock nut in side elevation upon the end of a bolt, the nut not being seated; and Fig. 2 is a view similar to Fig. 1 but showing the nut seated and the distortion of the nut produced in screwing it to its seat, the nut being shown in section.

Referring to the drawing, 1 represents my improved lock nut, the same having a threaded opening at 2 whereby it may be screwed upon a bolt 3. The under side of the nut 1 is inclined slightly with reference to the axis of the threaded opening 2 as will be seen in Fig. 1, so that the thicker portion of the nut at 4 will come into contact with the piece 5 against which the nut seats before the nut reaches its final position. Fig. 1 illustrates the nut as with its thicker portion nearly in contact with the piece 5 while Fig. 2 illustrates the nut in its final seated position.

The nut 1 is provided with a slit 6 in its thicker portion, said slit extending from the side of the nut into and preferably about half way across the threaded opening 2; and said slit is preferably, but not necessarily, inclined upwardly as shown. The slit is preferably located in the lower part of the thicker portion of the nut 1 so as to leave more material above than below it.

The slit 6 is wider at its outer end or at the periphery of the nut than at any other portion, the walls of the slit being inclined with reference to one another from the outer end of the slit to some point within the nut. The walls of the slit are shown as approaching one another until at about the point where the slit intersects the threaded opening of the nut, beyond which point the walls of the slit are parallel. The mutually inclined or converging walls referred to may be secured by inclining the outer portion of one only or of both walls of the slit with reference to the inner portion of the walls, and as shown in Fig. 1 this inclined relationship is secured by inclining the outer portion 7 of the upper wall of the slit 6 with reference to the inner portion 8 of such upper wall, the lower wall of the slit being plane.

The degree of inclination of the walls as aforesaid is such that when the nut reaches its final position as shown in Fig. 2 the outer portion of the walls of the slit 6, that is the portions which are inclined with reference to one another, will contact with one another throughout a comparatively extensive area, as indicated at 9, Fig. 2, and not come into contact only along the line formed by the intersection of the slit with a plane surface forming a part of the periphery of the nut as would obviously be the case if the sides of the slit were parallel throughout.

Such being the construction of my improved lock nut and it being understood that the opening at 2 is threaded uniformly throughout, it will be seen that the nut will move freely upon the bolt 3 until the thicker portion at 4 comes into contact with the piece 5 upon which the nut is to be seated. As the nut is turned farther the thicker portion 4 thereof will be forced against the piece 5, and the act of forcing the nut into its final position will result in the portion thereof beneath the slit 6 being forced upward, thus bringing the inclined walls of the outer portion of the slit into contact with one another and producing a binding and locking action between the threads of the nut and those of the bolt.

It will be understood that while the friction between the under side of the nut and the piece against which it seats is amply sufficient to prevent the nut from turning backward of itself and becoming loose, it may nevertheless be readily unscrewed as by a wrench; and that the nut may be repeatedly tightened and loosened as may be required without in any way injuring the nut or impairing its efficiency.

Having thus described my invention and explained its action, I claim and desire to secure by Letters Patent:

1. A lock nut formed as a single integral element and having a threaded opening and having its lower surface inclined with reference to said opening, and having also a slit located in its thicker portion and extending from the side of the nut into said threaded opening, the walls of the outer portion of said slit being inclined with reference to one another and said slit being widest at its outer end.

2. A lock nut formed as a single integral element and having a threaded opening and having its lower surface inclined with reference to said opening, and having also an inclined slit located in its thicker portion and extending from the side of the nut into said threaded opening, the walls of the outer portion of said slit being inclined with reference to one another and said slit being widest at its outer end.

3. A lock nut formed as a single integral element and having a threaded opening, and having its lower surface inclined with reference to said opening, and having also an inclined slit located in its thicker portion and extending into said threaded opening, the walls of the outer portion of said slit being inclined with reference to one another and said slit being widest at its outer end.

4. A lock nut formed as a single integral element and having a threaded opening and having its lower surface inclined with reference to said opening, and having also an upwardly inclined slit located in its thicker portion and extending from the side of the nut into said threaded opening, the walls of the outer portion of said slit being inclined with reference to one another and said slit being widest at its outer end.

5. A lock nut formed as a single integral element and having a threaded opening, and having its lower surface inclined with reference to said opening, and having also a slit located in the lower part of its thicker portion and extending from the side of the nut into said threaded opening, the walls of the outer portion of said slit being inclined with reference to one another and said slit being widest at its outer end.

6. A lock nut formed as a single integral element and having a threaded opening, and having its lower surface inclined with reference to said opening, and having also an upwardly inclined slit located in the lower part of its thicker portion and extending from the side of the nut into said threaded opening, the walls of the outer portion of said slit being inclined with reference to one another and said slit being widest at its outer end.

This specification signed and witnessed this twenty-third day of May A. D. 1910.

JOHN J. FARRELL.

In the presence of—
CHAS. B. CONNOLLY,
JAS. C. HUGHES.